United States Patent [19]

Pfaendner

[11] Patent Number: 5,116,913
[45] Date of Patent: May 26, 1992

[54] POLYAMIDE-POLYIMIDE BLOCK COPOLYMERS SOLUBLE IN APROTIC DIPOLAR SOLVENTS

[75] Inventor: Rudolf Pfaendner, Rimbach/Odenwald, Fed. Rep. of Germany

[73] Assignee: Ciba-Geigy Corporation, Ardsley, N.Y.

[21] Appl. No.: 470,196

[22] Filed: Jan. 25, 1990

[30] Foreign Application Priority Data

Feb. 1, 1989 [CH] Switzerland ............ 377/89

[51] Int. Cl.⁵ .............. C08L 79/08; B32B 27/08
[52] U.S. Cl. .................... 525/432; 525/436; 428/422; 428/423.5; 428/426; 428/443; 428/458; 428/473.5
[58] Field of Search .................. 525/432, 436

[56] References Cited

U.S. PATENT DOCUMENTS 3,894,114  7/1975  Lohmann et al.
4,503,285  3/1985  Darms et al.
4,657,832  4/1987  Pfeifer

FOREIGN PATENT DOCUMENTS 0260709  3/1988  European Pat. Off.

OTHER PUBLICATIONS

C.A. 107:134873 (1987).
C.A. 109:74163.

Primary Examiner—Ana L. Carrillo
Attorney, Agent, or Firm—JoAnn Villamizar

[57] ABSTRACT

A process for the preparation of crosslinked polymers by heating selected polyamide-polyimide block copolymers having an average molecular weight $M_n$ of 1,000–50,000 is described. In the compounds, at least 10 mol % of alkyl-substituted diaminodiphenylmethane groups, relative to the total amount of diamine radicals in the polyamide and polyimide blocks, are co-condensed.

The uncrosslinked compounds are soluble in dipolar, aprotic solvents.

15 Claims, No Drawings

POLYAMIDE-POLYIMIDE BLOCK COPOLYMERS SOLUBLE IN APROTIC DIPOLAR SOLVENTS

The present invention relates to a process for the preparation of crosslinked products and novel polyamide-polyimide block copolymers (described below as PAPI block copolymers) which can be used for the preparation of these products.

PAPI block copolymers are known per se and are described, for example, in DE-A 2,342,464. Owing to their good electrical, thermal and/or mechanical properties, they are suitable for use, for example, as matrix resins for the production of composite materials, as coating resins in the electrical and electronics industries, as flexible laminating resins, as spread adhesives or as compression-moulding materials. Conventional PAPI block copolymers are insoluble or only slightly soluble in organic solvents, as is known, for example from U.S. Pat. No. 4,503,285. In order to utilize the good properties of the PAPI block copolymers, it is therefore generally necessary to start from the readily soluble precursor, the polyamide-polyamic acid block copolymers. This procedure is not satisfactory in many respects. Firstly, the soluble precursors are, as a rule, only stable on storage to a limited extent, since the amount of water formed by cyclization results in a degradation of the molecular weight and/or the cyclization results in precipitation of the polymer. If, in addition, the imidization is carried out only during processing, the resulting product can exhibit defects, such as holes and/or bubbles, as a result of the water which escapes.

There is, therefore, a desire for soluble PAPI block copolymers which do not have these disadvantages. Polymers of this type have already been described in JP-A 62/30,121 and in EP-A 260,709. The previously known compounds are characterized by the use of tetranuclear aromatic diamine units in the polyamide blocks and the polyimide blocks and by the presence of polyamide-imide units in the polyimide blocks.

Soluble PAPI block copolymers of this type have advantages in processing and can be stored virtually indefinitely in the form of solutions or solids. On the other hand, PAPI block copolymers which are soluble in organic solvents have the disadvantage of being attacked by such solvents. A soluble PAPI block copolymer which, after application from solution, can be stabilized in a subsequent step against attack by solvents is, therefore, desirable.

Radiation-crosslinkable polymers are known from EP-A 134,752. A characteristic feature of these compounds is the presence of a diimide unit based on benzophenone tetracarboxylic acid and aliphatic, cycloaliphatic, araliphatic or substituted aromatic amine radicals. These diimide units can be incorporated not only into polyimides but also into other polymers, inter alia also PAPI block copolymers.

It has now been found that soluble PAPI block copolymers can crosslink under the influence of heat, if these compounds have a certain content of alkyl-substituted diaminodiphenylmethane radicals. This fact must be regarded as surprising, since the polyimides described in EP-A 134,752 are certainly radiation-crosslinkable, but cannot be crosslinked by heat in every case. In addition, in the case of the PAPI block copolymers according to the invention, crosslinkability is not linked with the presence of a benzophenonetetracarboxylic acid unit.

The process according to the invention makes it possible to prepare in an advantageous manner coatings having large layer thicknesses or shaped articles, since the thermal curing takes place uniformly within the entire curable material.

The present invention relates to a process for the preparation of crosslinked polyamide-polyimide block copolymers, which comprises heating, at temperatures above the glass transition point, a soluble polyamide-polyimide block copolymer having an average molecular weight $M_n$ of 1,000–50,000, particularly 5,000–40,000, containing combinations of blocks of the formulae Ia together with IIb and/or IIc or of the formulae Ib together with IIa and/or IIc or of the formulae Ic together with IIa and/or IIb

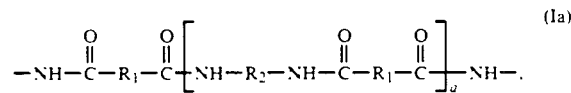
(Ia)

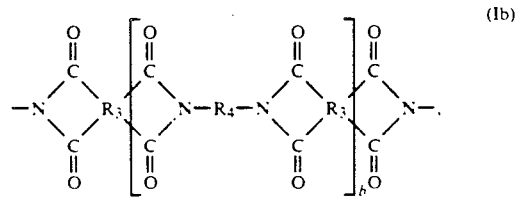
(Ib)

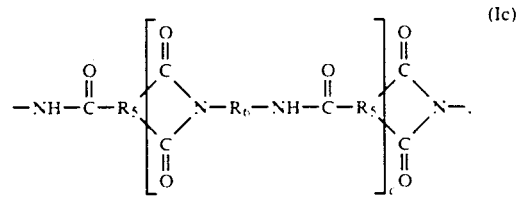
(Ic)

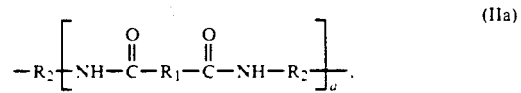
(IIa)

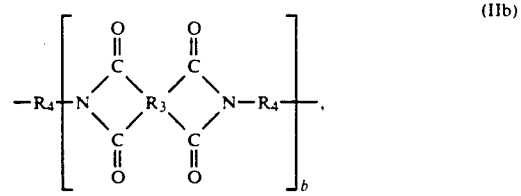
(IIb)

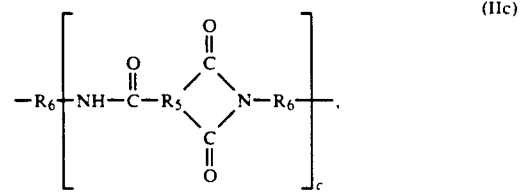
(IIc)

in which the indices a, b and c independently of one another are integers from 1 to 100, $R_1$ is a radical of the formulae $-C_nH_{2n}-$,

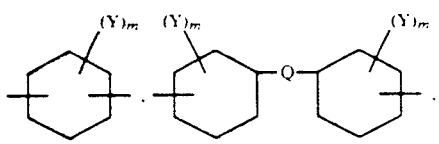

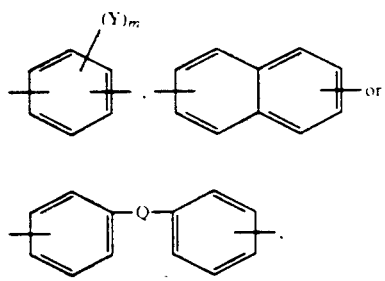

n is an integer from 2 to 12, m is an integer from 0 to 4, Y is alkyl or halogen, or in which two radicals Y which are each in the ortho-position relative to one another together form an alkylene group. Q is a direct bond or —CH$_2$—, —CH$_2$—CH$_2$—, —CH(CH$_3$)—, —C(CH$_3$)$_2$—, —C(CF$_3$)$_2$—, —O—, —S—, —SO$_2$— or —CO—, R$_2$ is a radical of the formulae —C$_n$H$_{2n}$—,

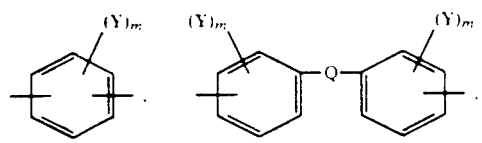

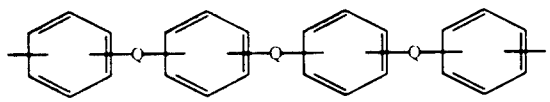

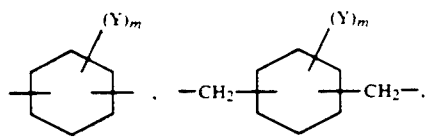

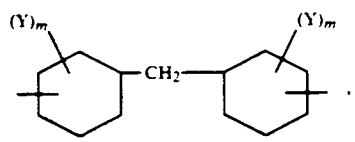

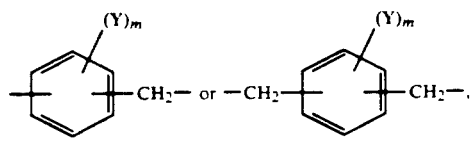

n, m, Q and Y have one of the meanings defined above, R$_3$ is a radical of the formulae

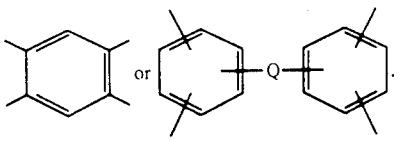

in which Q has one of the meanings defined above, R$_5$ is a radical of the formula

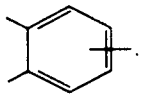

and R$_4$ and R$_6$ independently of one another have one of the meanings defined for R$_2$, with the proviso that 10-100 mol %, preferably 25-100 mol % and particularly 50-100 mol % of all the radicals R$_2$, R$_4$ and R$_6$, relative to the total quantity of these radicals, have the formula

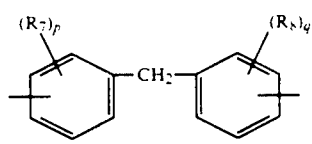

in which p is 1 or 2 and q is 0, 1 or 2, R$_7$ and R$_8$ are alkyl or
in which two radicals R$_7$ and R$_8$ which are each in the ortho-position relative to one another together each form an alkylene group.

The term "soluble PAPI block copolymer" is, in general, to be understood as meaning a copolymer which is soluble in dipolar, aprotic solvents and from which solutions containing at least 5% by weight, particularly at least 10% by weight, of PAPI block copolymer, relative to the solution, can be prepared.

The temperatures for the crosslinking stage vary in general, depending on the copolymer used. The terms "glass transition point" or "glass transition temperature" (=T$_g$ value) relate, within the scope of this description, to the values of the polymer in the particular formulation. These can be values which are also below the values of the pure polymer. Thus, for example, polymers containing solvents and/or plasticizers can have T$_g$ values which are below the values of the pure polymer. T$_g$ values can be determined, for example, by differential scanning calorimetry (DSC), the "onset value" being used here [=point of intersection of the baseline prolonged with the tangent to the experimental curve in the region of steepest ascent].

The ratio of polyamide blocks to polyimide blocks in the copolymers employed according to the invention is determined, in general, by the desired solubility of these copolymers in dipolar, aprotic solvents and by the crosslinking density in the desired end product. The proportions of each of these blocks are so chosen that the block copolymer is soluble in dipolar, aprotic solvents.

The preferred ratio of amide groups to imide groups in the copolymers employed according to the invention is 4:1 to 1:4.

The average molecular weights M$_n$ of the polyamide blocks Ia and IIa or of the polyimide blocks Ib and IIb or of the polyamide-imide blocks Ic and IIc are, in general, 300 to 20,000, preferably 500 to 10,000.

As well as the combinations of two blocks mentioned above, the PAPI block copolymers employed according to the invention can also contain three-block combinations of the formulae Ia, Ib and IIc or of the formulae Ia, Ic and IIb or of the formulae Ib, Ic and IIa.

It is preferable to use PAPI block copolymers consisting essentially of polyamide blocks Ia and polyimide blocks IIb or of polyamide blocks IIa and polyimide blocks Ib.

The index n is preferably 6 to 12 and the index m is preferably 0 or 1, especially 0.

An alkyl substituent Y, $R_7$ or $R_8$ in the above formulae can be branched or, preferably, linear. Linear $C_1$-$C_6$alkyl is preferred. Examples of these are methyl, ethyl, n-propyl, n-butyl, n-pentyl and n-hexyl. Methyl and ethyl are particularly preferred.

If two of each of the radicals Y, $R_7$ or $R_8$ together form an alkylene chain, this is preferably trimethylene or especially tetramethylene.

As halogen, Y is preferably chlorine or bromine.

Examples of $R_1$ in the above formulae are 1,3-phenylene, 1,4-phenylene, 2,4-tolylene, 1,5-naphthylene, 1,8-naphthylene, 2,6-naphthylene, 4,4'-biphenylene,

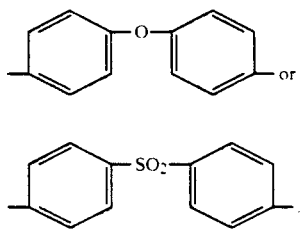

The preferred radical $R_1$ is 1,3-phenylene.

Examples of $R_1$, $R_2$, $R_4$ or $R_6$ as a group —$C_nH_{2n}$— are 1,2-ethylene, 1,2-propylene, 1,3-propylene, 2,2-propylidene, 1,4-tetramethylene, 1,5-pentamethylene, 1,6-hexamethylene, 1,7-heptamethylene, 1,8-octamethylene, 1,9-nonamethylene, 1,10-decamethylene, 1,12-dodecamethylene, 2,9-decamethylene or 2-methyl-1,5-pentamethylene.

As a group

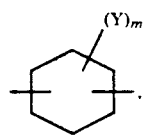

$R_1$, $R_2$, $R_4$ or $R_6$ can be 1,2-cyclohexylene, 1,3-cyclohexylene or, preferably, 1,4-cyclohexylene.

Further examples of specific cycloaliphatic groups $R_2$ and/or $R_4$ and/or $R_6$ are the following

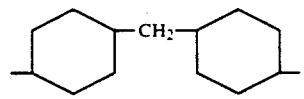

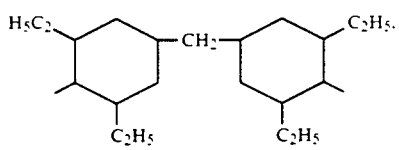

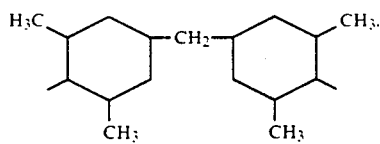

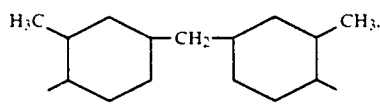

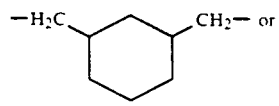

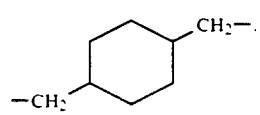

Examples of specific araliphatic groups $R_2$ and/or $R_4$ and/or $R_6$ are 1,3-xylylene.

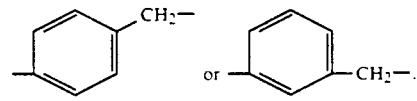

Examples of specific aromatic groups $R_2$ and/or $R_4$ and/or $R_6$ are 1,2-phenylene, 1,3-phenylene, 1,4-phenylene, 2,4-tolylene, 4-chloro-1,3-phenylene, 2,5-dichloro-1,4-phenylene or one of the following groups

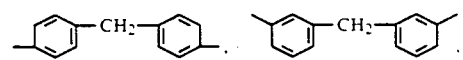

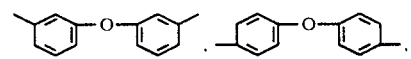

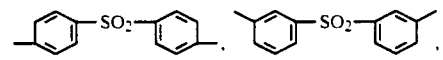

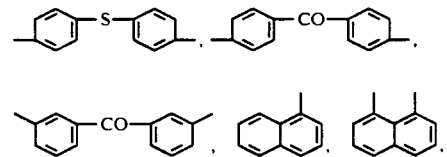

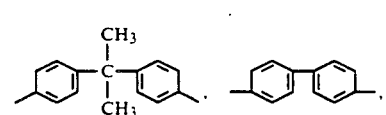

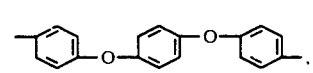

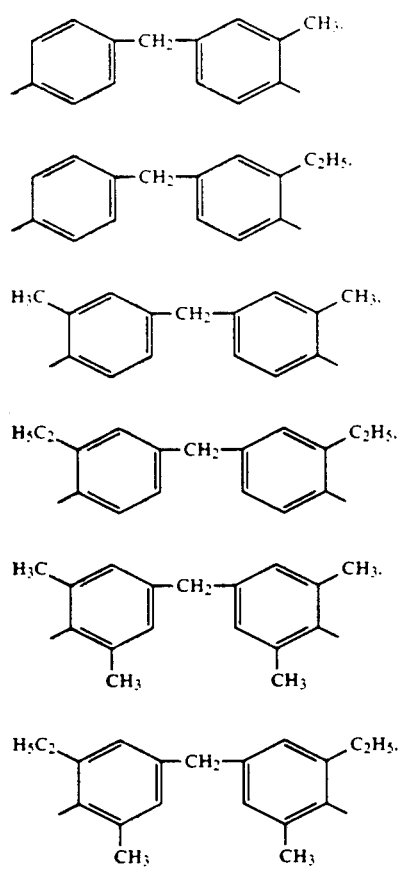

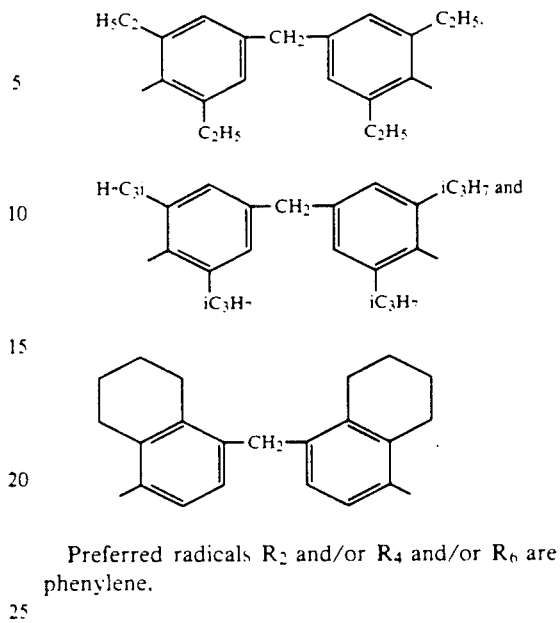

Preferred radicals $R_2$ and/or $R_4$ and/or $R_6$ are 1,3-phenylene.

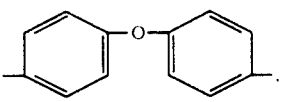

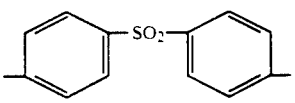

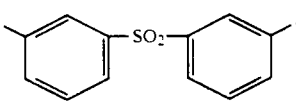

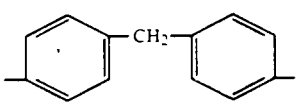

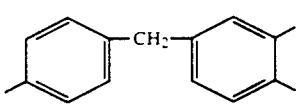

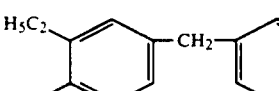

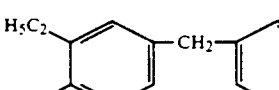

The preferred alkyl-substituted radicals of diaminodiphenylmethane generally contain alkyl substituents in at least one, preferably two, ortho-positions relative to the amino group. These are especially groups of the formulae It has been found that the heat stability of the PAPI block copolymers employed according to the invention and of the crosslinked products obtainable therefrom is particularly good if they possess a high proportion of aromatic radicals. PAPI block copolymers containing mainly aromatic or araliphatic radicals, for instance those enumerated above as examples of $R_1$ to $R_6$, are therefore preferably used.

A bridge member Q in the radicals $R_1$, $R_2$, $R_3$, $R_4$ or $R_6$ is preferably —$CH_2$—, —$C(CH_3)_2$—, —O—, —$SO_2$—

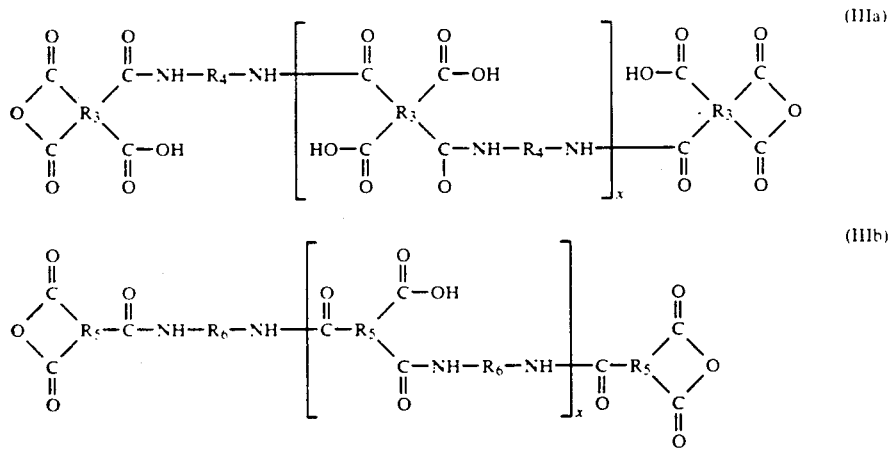

(IIIa)

(IIIb)

or —CO—.

Several bridge members Q present in a radical $R_2$, $R_4$ or $R_6$ can be identical or different.

The tetravalent radical $R_3$ is derived from a selected tetracarboxylic acid capable of forming a dianhydride. Radicals of the formulae

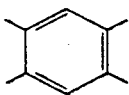

and in particular

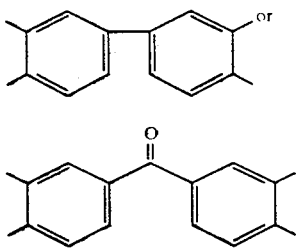

are preferred in this regard.

The proportion of alkyl-substituted diaminodiphenylmethane in the compounds employed according to the invention is preferably more than 50 mol%, particularly about 100 mol%, relative to the proportion of the diamine radicals in these polymers.

With the exception of the compounds in which $R_3$ is a radical of benzophenone tetracarboxylic acid, the compounds containing combinations of blocks of the formulae, defined above, Ia together with IIb and/or IIc or of the formulae Ib together with IIa and/or IIc or of the formulae Ic together with IIa and/or IIb are novel and also form a subject of the present invention.

The preparation of the block copolymers employed according to the invention is effected in a manner known per se and can, for example, be effected by one of the procedures described in DE-A 2,342,464 by reacting preformed polyamide and polyamic acid blocks and subsequently cyclizing the polyamide-polyamic acid.

Another method of preparation comprises the reaction of polyamic acids of the formula IIIa and/or IIIb with diamines of the formula IV

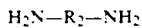

$H_2N—R_2—NH_2$ (IV)

and with dicarboxylic acid chlorides of the formula V

$Cl—OC—R_1—CO—Cl$ (V)

and the subsequent cyclization of the polyamide-polyamic acid block copolymers thus obtained. In the formulae IIIa, IIIb, IV and V the symbols $R_1$, $R_2$, $R_3$, $R_4$, $R_5$ and $R_6$ are as defined above and x is an integer $\geq 0$, preferably $\geq 1$.

The preparation of the polyamic acids of the formulae IIIa or IIIb is also known per se and is effected, for example, by reacting tetracarboxylic anhydrides of the formula VIa or tricarboxylic anhydrides VIb or a corresponding tricarboxylic anhydride-chloride

(VIa)

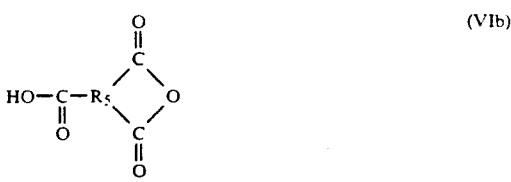

(VIb)

in which $R_3$ and $R_5$ are as defined above with a less than equivalent amount of a diamine of the formula IV.

The starting materials of the formulae IV, V, VIa and VIb are known per se and are in some cases available commercially.

The alkyl-substituted diaminodiphenylmethanes are described, for example, in EP-A 134,752 or in EP-A 132,221.

The average molecular weights of the individual blocks can be adjusted to a desired value by selecting suitable reaction conditions, for example by suitable selection of the molar ratios of the reactants. This selection is known per se to those skilled in the art.

The polycondensation of the di-, tri- or tetra-carboxylic acid derivatives of the formulae IIIa, IIIb, V, VIa or VIb with the diamines of the formula IV can be carried out in a manner known per se, preferably in an anhydrous organic solvent and with the exclusion of moisture, for example under nitrogen at temperatures between −20° C. and +50° C., particularly about −15° C. to +10° C.

Examples of suitable organic solvents are N,N-dimethylacetamide, N,N-diethylacetamide, N,N-dimethylformamide, N-methyl-2-pyrrolidone (NMP), N-acetyl-2-pyrrolidone, N-methyl-ε-caprolactam, N,N,N',N'-tetramethylurea, tetrahydrothiophene dioxide (sulfolane) and dimethyl sulfoxide.

The reaction can also be carried out in mixtures of such solvents. On the other hand, it is also possible to dilute these preferred solvent systems with other organic, aprotic solvents, such as aromatic, cycloaliphatic or aliphatic hydrocarbons, if appropriate chlorinated hydrocarbons, for example toluene, xylenes, cyclohexane, pentane, hexane, petroleum ether, methylene dichloride, tetrahydrofuran, cyclohexanone and dioxane.

The polyamide blocks can also be prepared by interface polycondensation.

After the reaction is complete, the solvents can, if desired, be removed in a customary manner, for example by distillation, if appropriate under reduced pressure. If desired, the polyamide-polyamic acid block copolymers can be precipitated by methods known per se by pouring the reaction solution into a precipitant, such as water or aliphatic hydrocarbons, for example petroleum ether, but particularly methanol, isopropanol, acetone, symmetrical ethers of mono-, di- or triethylene glycol or acetonitrile, and can, if desired, be dried.

The cyclization of the polyamide-polyamic acid block copolymers to give the corresponding PAPI block copolymers is carried out by heating the polyamide-polyamic acid block copolymers at temperatures between 50° and 250° C., preferably without prior isolation, i.e. without further treatment in the reaction solution described above, or treating them with a dehydrating agent, on its own or mixed with a tertiary amine. Examples of suitable dehydrating agents are acetic anhydride or propionic anhydride or a mixture of acetic anhydride and triethylamine or pyridine. Processes of this type are described, for example, in U.S. Pat. No. 3,894,114, U.S. Pat. No. 4,124,651 or U.S. Pat. No. 4,503,285.

The block copolymers employed according to the invention can also be prepared by first synthesizing a polyamide block or a polyamide-imide block in a manner known per se and then reacting the latter with a tetracarboxylic anhydride and a diamine to prepare the polyamide-polyamic acid block copolymer, which is then cyclized.

The PAPI block copolymers employed according to the invention possess good solubility in aprotic, dipolar solvents which is suitable for the problem mentioned initially. Very good solubilities can be achieved, if appropriate with warming, in, for example, N,N-dimethylacetamide, N,N-dimethylformamide, N,N-dimethylacetamide, N-methyl-2-pyrrolidone, sulfolane, dimethyl sulfoxide or γ-butyrolactone.

It should be mentioned that a high concentration of the polymeric compounds is usually desirable. The solutions thus prepared are stable on storage, in contrast with the polyamic acid-polyamide precursor. The same also applies, of course, to the solid itself.

Solutions which are essentially free from by-products and residues of monomer can be prepared in this manner. Processing is carried out extremely simply, because no cyclization step has to be gone through and hence there is no elimination of water, which results in undesirable effects and damage to the end product. When the PAPI block copolymers are used according to the invention it is merely necessary to remove the solvent and the preparation of products of a high quality and high heat stability which can be used at high temperatures is possible.

In a subsequent stage or at the same time as the removal of the solvent, the PAPI block copolymers can be crosslinked by heating. The temperatures for the crosslinking step generally vary according to the copolymer used. As a rule the copolymers are heated above their glass transition temperature or, in the case of more than one glass transition temperature, above their lowest glass transition temperature, preferably above their highest glass transition temperature. As a rule, crosslinking is carried out at temperatures between 250° and 350° C.

The process according to the invention makes it possible to prepare, by heating, crosslinked products which have an excellent resistance to solvents. The invention also relates, therefore, to the crosslinked products obtainable by this process.

The block copolymers according to the definition are distinguished by good processability, and can be used for the manufacture of industrial products, such as fibres, fibre-reinforced composite materials, laminated articles, cast articles, laminates, matrix resins, honeycomb-core materials, lacquers, adhesives, foams, coating compositions, films, compression-moulding powders, sintering powders and compression-moulded articles.

In particular, the block copolymers according to the definition can be used for the production of coatings, films and flexible laminates or as adhesives, matrix resins or compression-moulding materials.

For this purpose customary additives can be added to the block copolymers before the crosslinking stage, such as pigments, fillers, electrical conductors, for example carbon black or metal particles, agents for increasing the abrasion resistance, lubricants or reinforcing fibres, such as carbon, boron or glass fibres.

Laminated articles which can be obtained by the process according to the invention can, if desired, be provided with coating layers which improve the surface properties, for example layers composed of phenolic resins or aluminium, and they are used, inter alia, in aircraft construction.

Block copolymers according to the definition, preferably in the form of solutions, can also be used as coating compositions and adhesives, if desired with the addition of pigments such as titanium dioxide, customary fillers and foams, for coating and covering substrates of a very wide range of types in any desired form, such as films, fibres, fibre nonwovens, wires, lattice-like structures, fabrics or foams.

The following may be mentioned as suitable substrates: metals or alloys, such as copper, brass, aluminium, iron or steel; asbestos or glass fibre materials; polymers, such as cellulose materials (cellulose esters or ethers or paper); perfluorinated hydrocarbon polymers, for example polytetrafluoroethylene, polyolefins, polyesters, polyamides, polyimides or polyurethanes.

The following examples illustrate the invention.

SYNTHESIS EXAMPLE 1

Polyamic acid block:

95.70 g of 3,3',4,4'-benzophenonetetracarboxylic dianhydride (0.2970 mol) and 237 g of N-methylpyrrolidone (NMP) are weighed out under nitrogen into a reaction vessel with a double jacket, connection for protective gas, internal thermometer, dropping funnel and stirrer. The reaction vessel is evacuated three times and flushed with nitrogen. After it has been cooled to −10° C. a suspension is formed. A solution of 58.0 g of a technical mixture of 4,4'-diaminodiphenylmethane, 3-ethyl-4,4'-diaminodiphenylmethane and 3,3'-diethyl-4,4'-diaminodiphenylmethane (amine number 8.34 milliequivalents/g=M234=0.2447 mol) in 317 g of NMP is added via the dropping funnel in the course of 35 minutes at −15° C. The reaction mixture is then allowed to warm up to room temperature and is stirred for a further 2 hours.

Polyamide-polyamic acid block copolymer:

The clear reaction mixture is cooled again (−10° C.). 116.0 g of the diamine mixture (0.4957 mol) described above in 633 g of NMP are then added dropwise in the course of 40 minutes via the dropping funnel. Next 90.45 g (0.4455 mol) of isophthaloyl dichloride are added in portions at such a rate that the internal temperature does not exceed 0° C. About 120 minutes are required for this, and the solution becomes increasingly viscous. Finally, the polymer solution is stirred at room temperature for 30 minutes. A further 0.23 g (0.0011 mol) of isophthaloyl dichloride is added and the mixture is stirred for 1 hour to complete the polycondensation. 67.95 g (0.9423 mol) of butylene oxide are then added in the course of 15 minutes via a dropping funnel (internal temperature 22° C.). This gives a solution of a polyamide-polyamic acid block copolymer which has an intrinsic viscosity of 0.45 dl/g (0.5% by weight solids content in NMP/25° C.).

Cyclization:

The polyamide-polyamic acid block copolymer solution now present is then subjected to chemical cyclization to give the polyamide-polyimide block copolymer. This is effected by adding a mixture of 116.0 g (1.1365 mol) of triethylamine and 115.0 g (1.1361 mol) of acetic anhydride via a dropping funnel in the course of 20 minutes at 25° C. The mixture is then stirred for a further 8 hours at room temperature. The intrinsic viscosity (0.5% solids content, NMP, 25° C.) of a polyamide-polyimide block copolymer prepared in this way is 0.40 dl/g.

One part of the solution described above is diluted with the same amount of NMP, precipitated in a 10-fold amount of isopropanol and dried in vacuo (10 mbar) in a drying cabinet. The temperature is increased in stages to 200° C. in the course of 72 hours and is kept at this level for 16 hours. The intrinsic viscosity (0.5%, NMP, 25° C.) of the polymer is 0.49 dl/g. After this drying process, the polymer is soluble in NMP to the extent of more than 25%.

A part of the polyamide-polyimide block copolymer thus obtained is additionally heated at 320° C. for 60 minutes in vacuo. After this additional heat treatment the polymer is virtually completely insoluble in NMP.

Examples 2-14 of soluble polyamide-polyimide block copolymers, shown in the following table, are prepared as described under Example 1. The following abbreviations are used in the table:

$\eta_{in}$: intrinsic viscosity, measured on a 0.5% by weight solution of the polymer at 25° C. (in NMP), BTDA: 3,3',4,4'-benzophenonetetracarboxylic dianhydride, BPDA: 3,3',4,4'-biphenyltetracarboxylic dianhydride, IPC: isophthaloyl dichloride, TMAC: trimellitic anhydride-chloride, BADM: bis-(3,5-diethyl-4-aminophenyl)-methane, BEMA: bis-(3-ethyl-5-methyl-4-aminophenyl)-methane, BIDM: bis-(3,5-diisopropyl-4-aminophenyl)-methane, mDDS: 3,3'-diaminodiphenyl sulfone, pDDS: 4,4'-diaminodiphenyl sulfone, Diamine mixture: A technical product consisting of 4,4'-diaminodiphenylmethane, 3-ethyl-4,4'-diaminodiphenylmethane and 3,3'-diethyl-4,4'-diaminodiphenylmethane.

TABLE

Polyamide-polyimide block copolymers prepared analogously to Example 1

| No. | PI block Tetracarboxylic dianhydride (mol) | Diamine | | | | PA block Dicarboxylic dichloride (mol) | Diamine | | | |
|---|---|---|---|---|---|---|---|---|---|---|
| 1 | BTDA | Diamine mixture | | | | IPC | Diamine mixture | | | |
| Mol | 0.2970 | 0.2447 | | | | 0.4455 | 0.4957 | | | |
| 2 | BTDA | Diamine mixture | | | | IPC | Diamine mixture | | | |
| Mol | 0.2815 | 0.2470 | | | | 0.2177 | 0.2470 | | | |
| 3 | BTDA | Diamine mixture | | | | IPC | Diamine mixture | | | |
| Mol | 0.2002 | 0.3566 | | | | 0.0643 | 0.1585 | | | |
| 4 | BTDA | pDDS | | | | IPC | Diamine mixture | | | pDDS |
| Mol | 0.1551 | 0.1292 | | | | 0.2326 | 0.1292 | | | 0.1292 |
| 5 | BTDA | mDDS | pDDS | Diamine mixture | | IPC | Diamine mixture | | mDDS | pDDS |
| Mol | 0.1500 | 0.0417 | 0.0417 | 0.0417 | | 0.2275 | 0.0833 | | 0.0833 | 0.0833 |
| 6 | BTDA | mDDS | pDDS | BADM | | IPC | BADM | | mDDS | pDDS |
| Mol | 0.1500 | 0.0417 | 0.0417 | 0.0417 | | 0.2275 | 0.0833 | | 0.0833 | 0.0833 |
| 7 | BTDA | mDDS | pDDS | BIDM | | IPC | BIDM | | mDDS | pDDS |
| Mol | 0.1500 | 0.0417 | 0.0417 | 0.0417 | | 0.2275 | 0.0833 | | 0.0833 | 0.0833 |
| 8 | BPDA | Diamine mixture | | | | IPC | Diamine mixture | | | |
| Mol | 0.1500 | 0.1250 | | | | 0.2275 | 0.2500 | | | |
| 9 | BPDA | pDDS | | Diamine mixture | | IPC | pDDS | | | |
| Mol | 0.1500 | 0.0625 | | 0.0625 | | 0.2275 | 0.2500 | | | |
| 10 | BTDA | BADM | | | | IPC | Diamine mixture | | | |
| Mol | 0.1250 | 0.0938 | | | | 0.0938 | 0.1250 | | | |
| 11 | BTDA | mDDS | BEMA | pDDS | | IPC | mDDS | BEMA | | pDDS |

TABLE-continued

Polyamide-polyimide block copolymers prepared analogously to Example 1

| Mol 12 | 0.2500 BTDA 0.2500 | 0.0695 | 0.0695 BEMA 0.1875 | 0.0695 | 0.3790 IPC 0.1879 | 0.1389 | 0.1389 BEMA 0.2500 | 0.1389 |
| Mol 13 | TMAC 0.2500 | | Diamine mixture 0.2920 | | IPC 0.1690 | | Diamine mixture 0.1250 | |
| Mol 14 | BPDA 0.2500 | | Diamine mixture 0.1875 | | TMAC 0.1895 | | Diamine mixture 0.2500 | |

| | | Temp. 200° C. | | | Temp. 320° C. | |
|---|---|---|---|---|---|---|
| | No. | $\eta_{in}$ [dl/g] PAPAS | $\eta_{in}$ [dl/g] PAPI | Solubility in NMP [%] | $\eta_{in}$ [dl/g] PAPI | Solubility in NMP [%] |
| | 1 Mol | 0.45 | 0.49 | >25 | — | <0.5 |
| | 2 Mol | 0.35 | 0.41 | >25 | — | <0.5 |
| | 3 Mol | 0.33 | 0.49 | >25 | — | <0.5 |
| | 4 Mol | 0.33 | 0.28 | >25 | 0.38 | ~1 |
| | 5 Mol | 0.52 | 0.52 | >25 | — | <0.5 |
| | 6 Mol | 0.38 | 0.38 | >25 | 0.40 | ~1 |
| | 7 Mol | 0.36 | 0.36 | >25 | 0.45 | ~1 |
| | 8 Mol | 0.41 | 0.54 | >20 | — | <0.5 |
| | 9 Mol | 0.85 | 0.67 | >25 | 0.78 | ~1 |
| | 10 Mol | 0.56 | 0.54 | >25 | — | <0.5 |
| | 11 Mol | 0.48 | 0.40 | >25 | 0.46 | ~1 |
| | 12 Mol | 0.49 | 0.51 | >25 | — | <0.5 |
| | 13 Mol | 0.67 | 0.59 | >25 | — | <0.5 |
| | 14 Mol | 1.45 | 0.80 | >25 | — | <0.5 |

EXAMPLE 15

Preparation of a coating by the process according to the invention.

A 25% by weight solution in NMP of the polyamide-polyimide block copolymer described above in Example 5 is applied to a copper foil by means of an applicator (height 200 μm). The bulk of the solution is removed by IR irradiation lasting 15 minutes. The polymer layer of the test strip thus produced can be removed by completely by immersion in NMP for 30 minutes. A further test strip is additionally heated in vacuo (15 mbar) from room temperature to 300° C. in the course of 30 minutes and is heated for a further 30 minutes at this temperature. This gives a flexible Cu foil having a bubble-free coating. The foil treated in this way is weighed, immersed in NMP for 30 minutes and weighed again. It is found that the coating is now insoluble in NMP. The only result is a slight increase in weight (0.7%) caused by NMP, which is reversible and can be removed by drying. The surface of the coating is unchanged before and after the NMP treatment.

EXAMPLE 16

This example shows the good mechanical properties of a flexible laminate prepared by the process according to the invention.

A copper foil is coated with a 25% solution in N-methylpyrrolidone of the block copolymer according to Synthesis Example 1, using an applicator (200 μm). The coating is dried with IR radiation (Heraeus model MBS 225/125) for 45 minutes. The coated foil is then cut up into strips 1 cm long, and the "flex-life" of the laminate is determined [= number of flexings before the laminate breaks, determined by Universal-model 2 FDF Flex Ductility Tester (manufacturer: Universal Manufacturing Co.) using a tensile weight of 224 g and a 2 mm mandrel]. This gives an average value of 319 cycles for 5 test strips.

What is claimed is:

1. A process for the preparation of crosslinked polyamide-polyimide block copolymers, which comprises heating, at temperatures above the glass transition point, a polyamide-polyimide block copolymer soluble in aprotic dipolar solvents and having an average molecular weight $M_n$ of 1,000–50,000 containing combinations of blocks of the formulae Ia together with IIb or IIc or of the formulae Ib together with IIa or IIc or of the formula Ic together with IIa or IIb

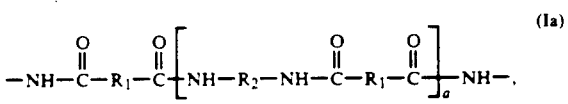

(Ia)

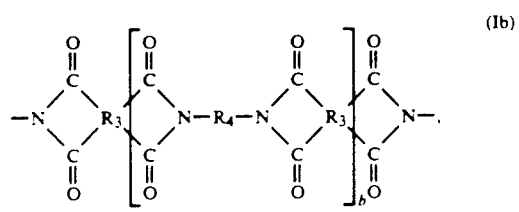

(Ib)

-continued

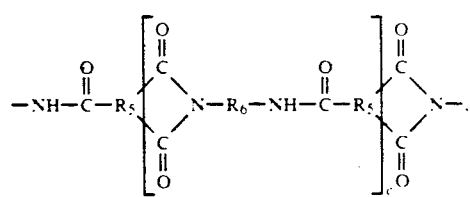
(Ic)

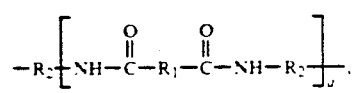
(IIa)

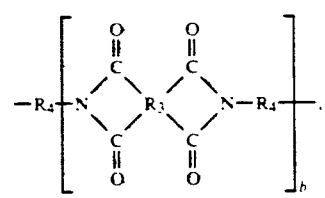
(IIb)

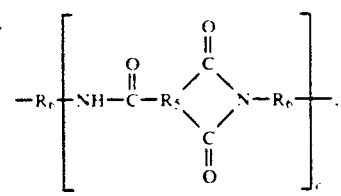
(IIc)

in which the indices a, b and c independently of one another are integers from 1 to 100. $R_1$ is a radical of the formulae $-C_nH_{2n}-$.

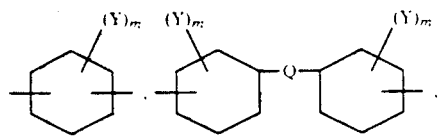

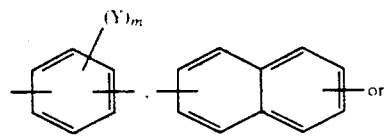

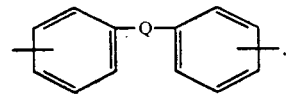

n is an integer from 2 to 12, m is an integer from 0 to 4, Y is alkyl or halogen, or in which two radicals Y which are each in the ortho-position relative to one another together form an alkylene group, Q is a direct bond or $-CH_2-$, $-CH_2-CH_2-$, $-CH(CH_3)-$, $-C(CH_3)_2-$, $-C(CF_3)_2-$, $-O-$, $-S-$, $-SO_2-$ or $-CO-$, $R_2$ is a radical selected from the group consisting of

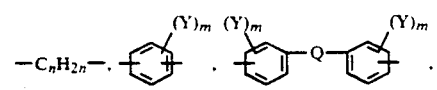

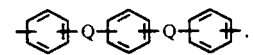

-continued

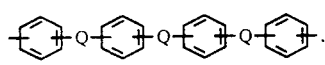

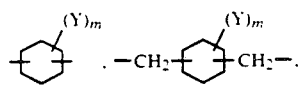

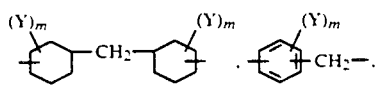

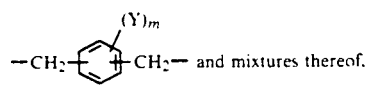
and mixtures thereof.

n, m, Q and Y have one of the meanings defined above. $R_3$ is a radical of the formulae

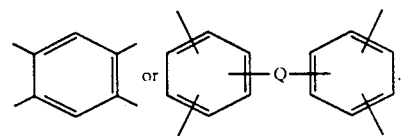

in which Q has one of the meanings defined above, $R_5$ is a radical of the formula

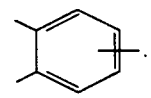

and $R_4$ and $R_6$ independently of one another have one of the meanings defined for $R_2$, with the proviso that 10-100 mol% of all the radicals $R_2$, $R_4$ and $R_6$, relative to the total quantity of these radicals, have the formula

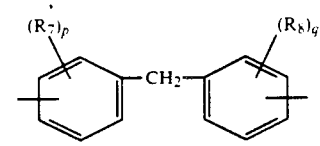

in which p is 1 or 2 and q is 0, 1 or 2, $R_7$ and $R_8$ are alkyl or in which two radicals $R_7$ and $R_8$ which are each in the ortho-position relative to one another together each form an alkylene group.

2. A process according to claim 1, wherein 50-100 mol % of all the radicals $R_2$, $R_4$ and $R_6$ relative to the total amount of these radicals, have the formula

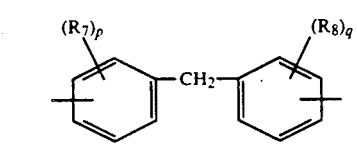

in which p is 1 or 2 and q is 0, 1 or 2, $R_7$ and $R_8$ independently are alkyl or in which two radicals $R_7$ and $R_8$ which are each in the ortho-position relative to one another together each form an alkylene group.

3. A process according to claim 1, wherein the ratio of amide groups to imide groups in the polyamide-polyimide block copolymers is 4:1 to 1:4.

4. A process according to claim 1, wherein the starting material is a polyamide-polyimide block copolymer consisting essentially of polyamide blocks Ia and polyimide blocks IIb or of polyamide blocks IIa and polyimide blocks Ib.

5. A process according to claim 1, wherein Y, $R_7$ or $R_8$ independently are linear $C_1-C_6$alkyl.

6. A process according to claim 1, wherein Y, $R_7$ or $R_8$ independently are methyl or ethyl.

7. A process according to claim 1, wherein $R_1$ is 1,3-phenylene.

8. A process according to claim 1, wherein the alkyl-substituted radicals of diaminodiphenylmethane $R_2$, $R_4$ and $R_6$ contain alkyl substituents in at least one ortho-position relative to the amino group.

9. A process according to claim 8, wherein the alkyl-substituted radicals of the diaminodiphenylmethane $R_2$, $R_4$ and $R_6$ contain alkyl substituents in two ortho-positions relative to the amino group.

10. A process according claim 1, wherein $R_2$, $R_4$ and $R_6$ are selected from the group consisting of 1,3-phenylene.

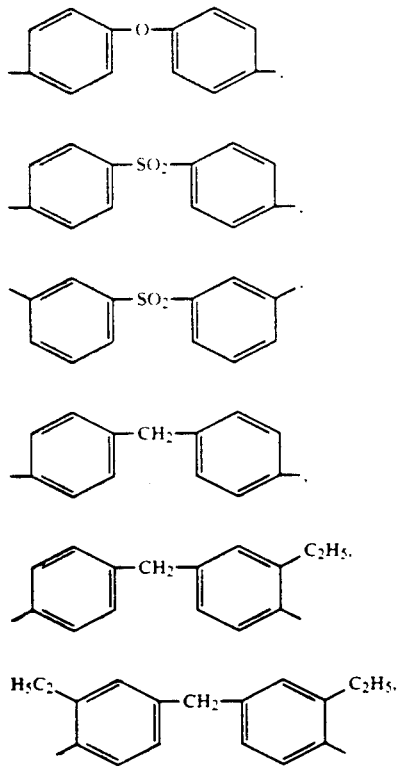

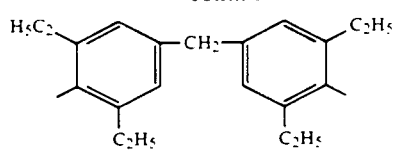

and mixtures thereof.

11. A process according to claim 1, wherein $R_3$ is a radical of the formulae

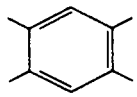

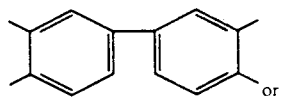

or

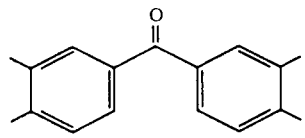

12. Process according to claim 11, wherein $R_3$ is a radical of the formula

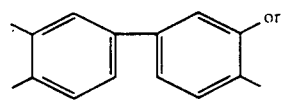

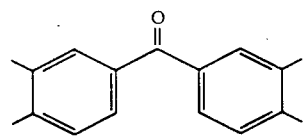

13. A process according to claim 1, wherein the proportion of alkyl-substituted diaminodiphenylmethane radicals in the diamine radicals $R_2$, $R_4$ and $R_6$ is about 100 mol %, relative to the total amount of these radicals.

14. A polyamide-polyimide block copolymer soluble in aprotic dipolar solvents and having an average molecular weight $M_n$ of 1,000–50,000 and containing combinations of blocks of the formulae Ia together with IIb or IIc or of the formulae Ib together with IIa or IIc or of the formula Ic together with IIa or IIb according to claim 1, with the proviso that $R_3$ is not a radical of benzophenone tetracarboxylic acid.

15. Coatings, films, flexible laminates, adhesives, composite materials or compression-mouldings obtained by thermal crosslinking the soluble block copolymer according to claim 1.